(12) United States Patent
Williams et al.

(10) Patent No.: US 11,084,109 B2
(45) Date of Patent: Aug. 10, 2021

(54) CUTTING DEVICE

(71) Applicant: F E ROBINSON (HOOTON) LTD, Hooton South Wirral (GB)

(72) Inventors: Guy Williams, Birkenhead (GB); David Williams, Birkenhead (GB)

(73) Assignee: Aerotool Ltd

( * ) Notice: Subject to any disclaimer, the term of this patent is extended or adjusted under 35 U.S.C. 154(b) by 0 days.

(21) Appl. No.: 15/577,229

(22) PCT Filed: May 25, 2016

(86) PCT No.: PCT/GB2016/051513
§ 371 (c)(1),
(2) Date: Nov. 27, 2017

(87) PCT Pub. No.: WO2016/189303
PCT Pub. Date: Dec. 1, 2016

(65) Prior Publication Data
US 2018/0133815 A1    May 17, 2018

(30) Foreign Application Priority Data
May 26, 2015 (GB) .................... 1508966

(51) Int. Cl.
*B23D 29/00* (2006.01)
*B23D 35/00* (2006.01)
*B21J 15/50* (2006.01)

(52) U.S. Cl.
CPC ......... *B23D 29/007* (2013.01); *B23D 35/001* (2013.01); *B21J 15/50* (2013.01)

(58) Field of Classification Search
CPC ....... B23D 29/007; B23D 35/001; B21J 15/50
See application file for complete search history.

(56) References Cited

U.S. PATENT DOCUMENTS

| | | | | |
|---|---|---|---|---|
| 2,526,955 A * | 10/1950 | Kugler | .................. | B21J 15/043 30/175 |
| 2,836,888 A * | 6/1958 | Hargrove | ................. | B21J 15/50 29/275 |
| 9,108,324 B1 * | 8/2015 | Chandrasekar | .......... | B26D 1/00 |
| 9,486,864 B2 * | 11/2016 | Luo | ......................... | B23D 21/00 |
| 2007/0277383 A1 * | 12/2007 | Tomasetti | ............... | B26B 17/00 30/286 |
| 2011/0203116 A1 | 8/2011 | Vary | | |

FOREIGN PATENT DOCUMENTS

FR           1234180 A        10/1960

\* cited by examiner

*Primary Examiner* — Omar Flores Sanchez
(74) *Attorney, Agent, or Firm* — Thorpe North & Western, LLP.

(57) ABSTRACT

The present invention relates to a cutting device for use in cutting a collar which is mounted on a bolt in half, the cutting device comprising: • a mouth (16) for receiving the portion of the collar (28) to be cut; • a pair of jaws (17a, 17b) diametrically opposite one another and located within the mouth (16), each jaw (17a, 17b) being provided with a cutting blade (18), • a driver (22) for moving at least one jaw (17a) relative to the other (17b) such that the collar (28) can be cut in half by the action of the jaws (17a, 17b) moving towards one another, and • a guard (15) which, in use, prevents the cutting blade (18) from protruding beyond the mouth (16) and damaging a surface adjacent to the collar (28) to be cut in half.

21 Claims, 9 Drawing Sheets

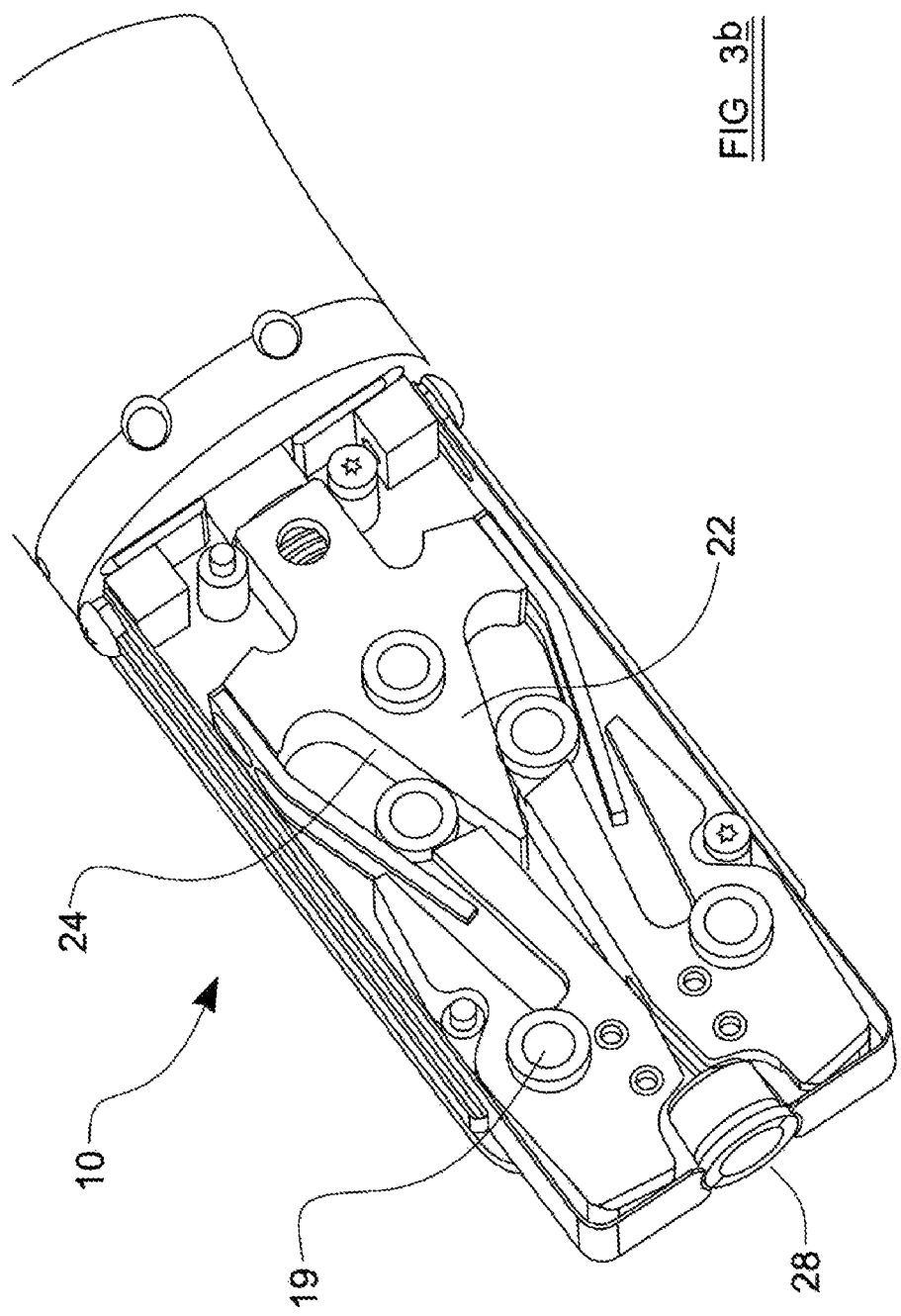

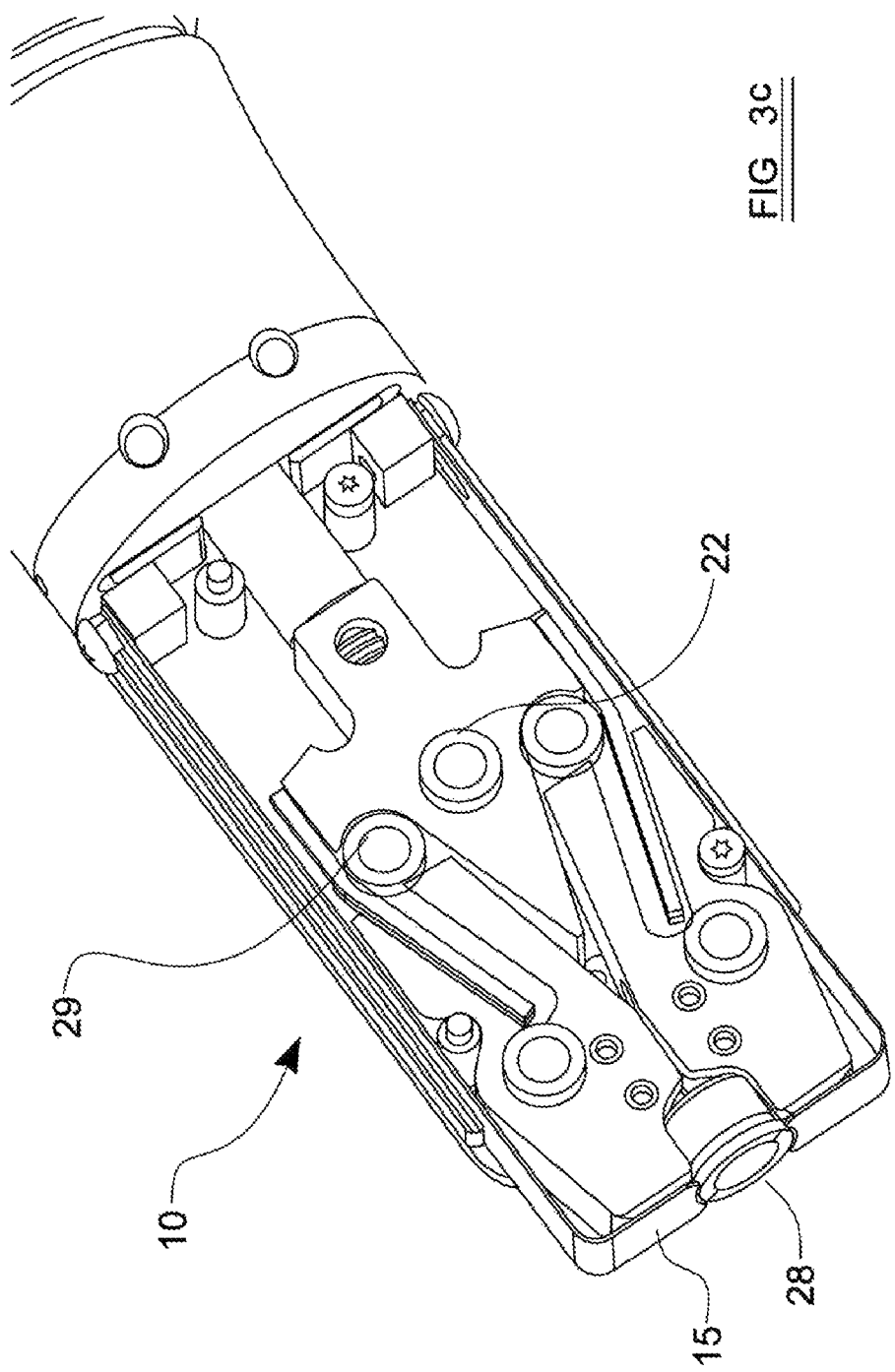

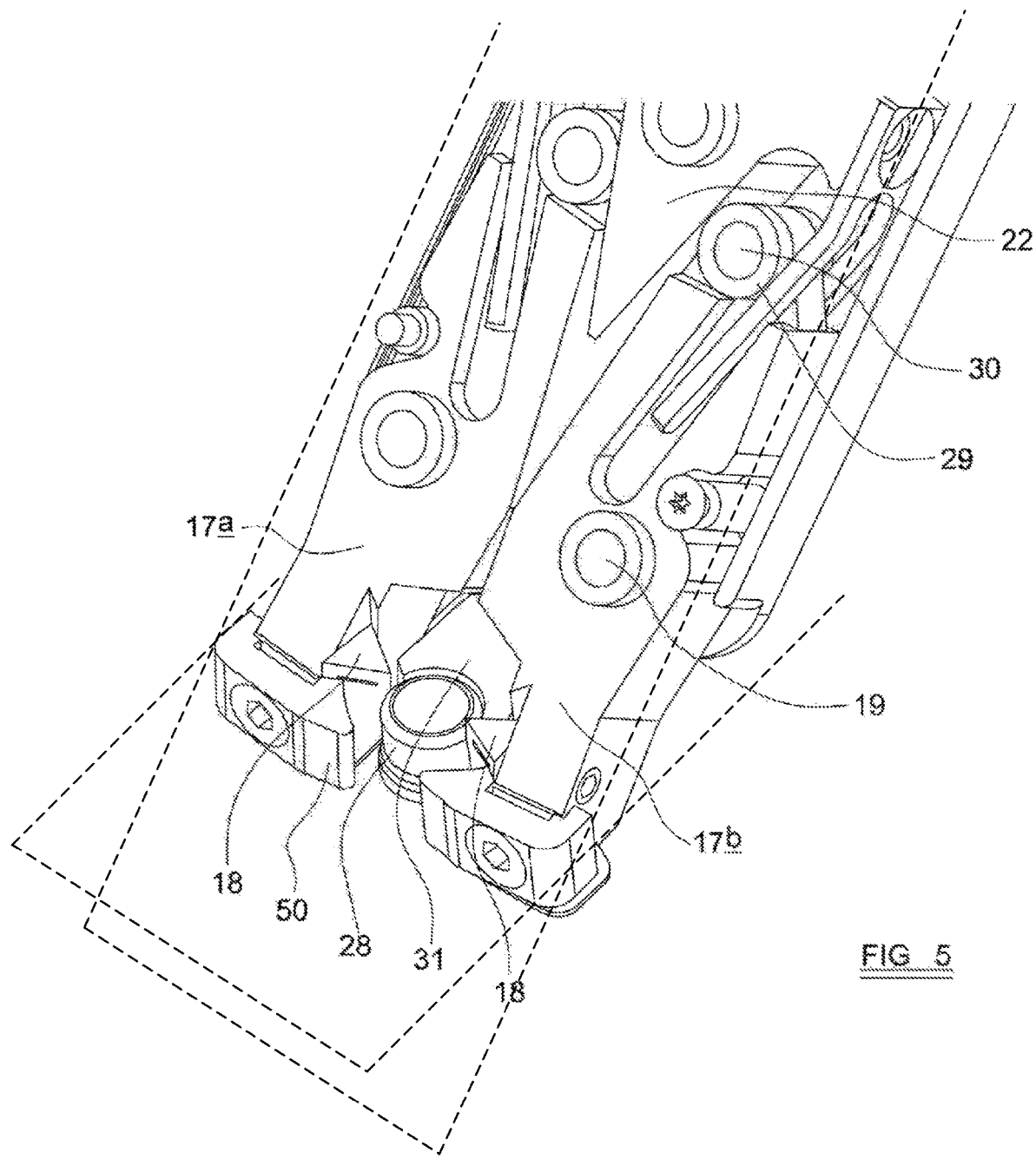

CUTTING DEVICE

The present invention relates to a cutting device for use in removing part of a fixing from the body of an aircraft, including the wing of an aircraft and/or the fuselage of an aircraft. In particular, the present invention relates to a hand-held cutting device which, in use, is used to remove a collar mounted on a bolt, the bolt being part of a fixing on the body of an aircraft, including the wing of an aircraft and/or the fuselage of an aircraft. More particularly, the present invention relates to a hydraulically driven cropper for use in removing a collar mounted on or attached to a bolt, the bolt being part of a fixing on the body of an aircraft, including the wing of an aircraft and/or the fuselage of an aircraft. There is also provided the use of the cutting device of the present invention to remove a collar from a bolt fixing located on the body of an aircraft, including the aircraft fuselage and wing assemblies. There is also provided a method of removing a collar mounted on or attached to a bolt, the bolt being part of a fixing on the body of an aircraft, including the wing of an aircraft and/or the fuselage of an aircraft During the manufacture of aircraft fuselage and wing assemblies thousands of fastenings, comprising a bolt and collar, are used to "bolt together" panels of aluminum alloy and/or carbon fiber sections and the stringers that strengthen the aircraft structure.

The bolt fastenings, in particular, bolts are usually countersunk headed at one end thereby providing a smooth/flush joint on the outer surface of the aircraft body or wing and fitted with a conventional crimped collar on the inside.

During the manufacture or maintenance of wing or body panels of an aircraft, it is common and desirable to remove some or all of these fastenings so that they may be replaced. To this end, fasteners that include a collar, crimped or otherwise, mounted thereon or attached thereto need to be removed by cutting the collar so that it may be removed from the bolt.

As will be appreciated by those in the field of aircraft manufacture and maintenance, the act of removing and replacing collar including fixings on a surface of an aircraft is not only time consuming, but can result in damage to the aircraft, if it is not done properly and/or due to shortcomings with the cutting apparatus or tooling currently utilized to remove the collars.

To remove the collar, it is preferable to cut the collar in half, otherwise a "C" shaped portion of the collar will be left behind firmly gripping its associated bolt. It will be appreciated that the subsequent removal of the firmly gripping "C" shaped portion of the collar can be difficult, will be time consuming and can result in damage to the surface of the aircraft adjacent to the collar being removed.

The current tooling or tools or cutting apparatus used to remove collars from these bolted fixings are extremely bulky. In some embodiments, the tooling has a remote power supply and comprises trailing compressed air hoses and unwieldy hydraulic hoses connected to the portion of the tool which carries out the actual act of cutting the collar. Due to the shear bulk of these hoses, the tooling is difficult to maneuver into position to carry out the act of cutting the collar. To this end, the remote power supply and the associated hydraulic hoses may need to be repositioned as the operator moves along the portion of the body of the aircraft where the collars are being replaced. Additionally, users have been known to get caught up in the unwieldy hoses resulting in personal injury.

Also, the current tooling is very complicated in structure and if a part becomes damaged, the tooling can be out of service for long periods of time due to the long lead time required to get replacement parts from a supplier. In some instances, it can take up to 26 weeks to receive a spare part.

It is also known to use hand-held manual collar croppers to cut these collars. Although these hand-held manual collar croppers are less bulky because they do not include the unwieldy hydraulic hoses etc. and hence, easier to maneuver to carry out the cutting process, they do require a substantial amount of manual force to be exerted by the user to actually successfully cut the collar in half. The use of hand held manual collar croppers has resulted in hand injuries and muscle strains. Also, the efficiency of a hand held manual collar cropper is dependent on the fitness and strength of the person using it. As will be appreciated, this can vary substantially from user to user. Additionally, it is difficult to ensure that the cutting force exerted by a hand held collar cropper is uniform. This can result in damage to the bolt from which the collar is being removed. To this end, in some instances, it is preferable that the bolt is reused i.e. it is only the collar of the "bolted fixing" which is being replaced.

With a view to at least addressing some of the problems identified above, the present invention provides a hand held hydraulically driven cropper for use in removing the collar from a bolted fixing located on the body of an aircraft, including the wing of an aircraft or the fuselage of an aircraft.

In a first aspect of the present invention there is provided a cutting device or cropper for use in cutting a collar which is mounted on a bolt in half, the cutting device comprising:
  a mouth for receiving the portion of the collar to be cut;
  a pair of jaws diametrically opposite one another and located within the mouth,
  each jaw being provided with a cutting blade,
  a driver for moving at least one jaw relative to the other such that the collar can be cut in half by the action of the jaws moving towards one another.

Advantageously, the cutting device includes a guard which, in use, prevents the cutting blade from protruding beyond the mouth and damaging a surface adjacent to the collar to be cut in half. Advantageously, the guard is removeably attachable to the cutting device. Preferably, at least the outer surface of the guard is polished. Further preferably, the guard is provided by two L-shaped or substantially L-shaped members, each located at either side of the entrance to the mouth.

Preferably, the cutting device includes a handle and can be hand-held in use.

Further preferably, the device is battery powered. Further preferably, the device includes a battery pack, which is preferably removeable.

Advantageously, the device comprises a rechargeable battery pack. Further preferably, the rechargeable battery pack is removeable.

Preferably, the battery is a lithium-ion battery or a graphene battery.

Further preferably, the driver is driven by an integral hydraulic driver system.

Advantageously, the jaws are pivotably mounted within the cutting device and the driver causes them to pivot towards one another to cut the collar.

Further preferably, the driver is wedge shaped.

Advantageously, the cutting device includes a resilient member such that the driver is resiliently biased by the action of the resilient member such that the driver is prevented from causing the jaws to move towards one another prior to the driver being actuated.

Further preferably, the device further includes a side guide to centre the collar relative to the jaws. Advantageously, the side guide is provided at either side of the mouth. Further preferably, the side guide is provided at one side of the mouth. Further advantageously, the outer surface of a or the side guide is shaped to complement the shape of the outer surface of the collar. Advantageously, the side guide is molded from a plastics material, preferably polyurethane.

Further preferably, the cutting blade lies in the same plane as the jaws.

Advantageously, the cutting blade lies in a plane which is offset, preferably by 45 degrees, from the plane of the jaws.

Preferably, the device further includes a stop member.

Advantageously, the cutting device of the present invention including one or more of the features above, is a hydraulic hand-held collar cropper.

In another aspect of the present invention there is provided the use of the cutting device of the present invention to remove a collar associated with or attached to a bolt located on the body of an aircraft including the fuselage and wing of an aircraft.

In a further aspect of the present invention, there is provided a method for cutting a collar attached to a bolt located on the body of an aircraft, the method involving the use of the cutting device of the present invention.

There is also provided a blade or blade member for use with the cutting device of the present invention, wherein the blade is triangular or substantially triangular in cross section.

In a further aspect of the present invention, there is provided the use of the blade of the present invention with the cutting device of the present invention.

Non-limiting embodiments of the present invention will now be described by way of reference to the accompanying drawings in which:

FIGS. 3A-3C are cross sectional views illustrating the interaction of the internal components during the cutting process;

Figure 6:
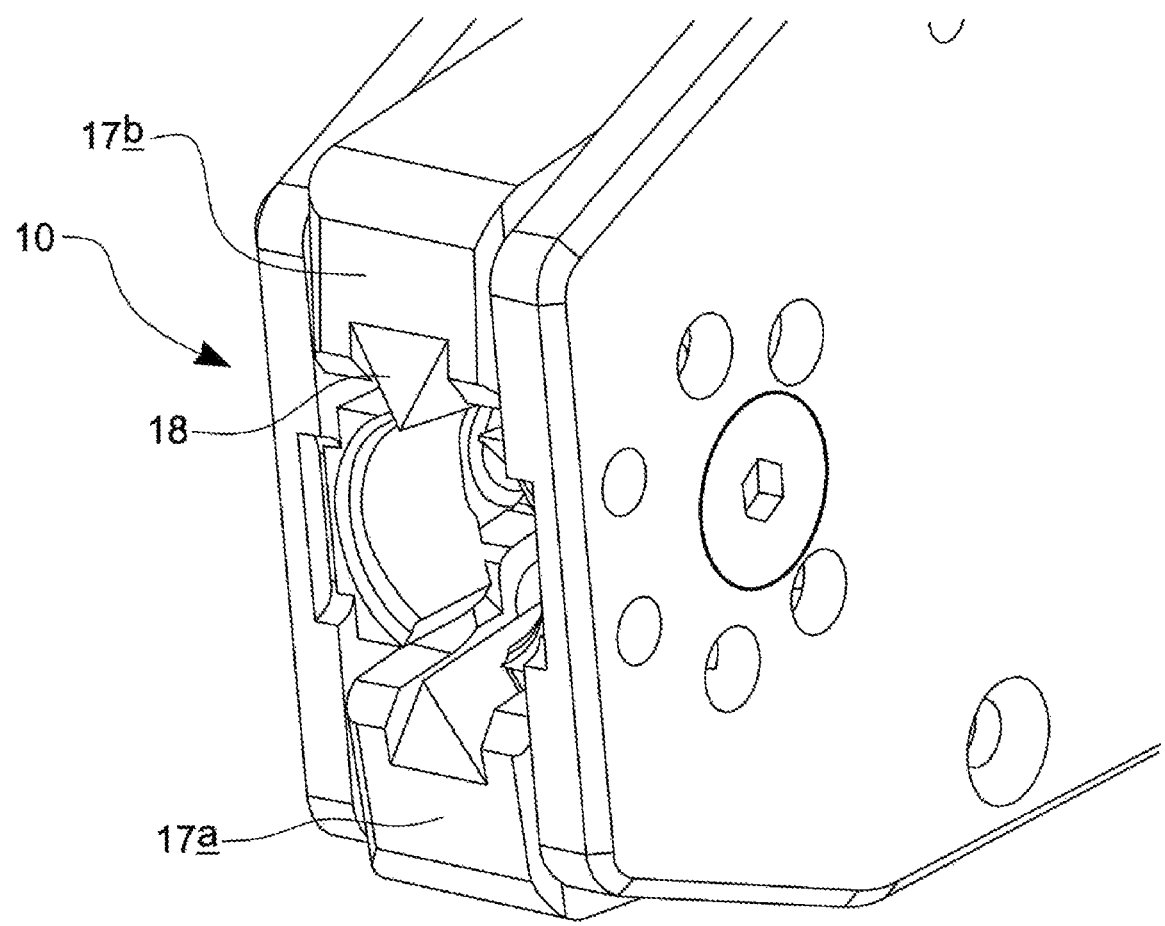
Figure 7:
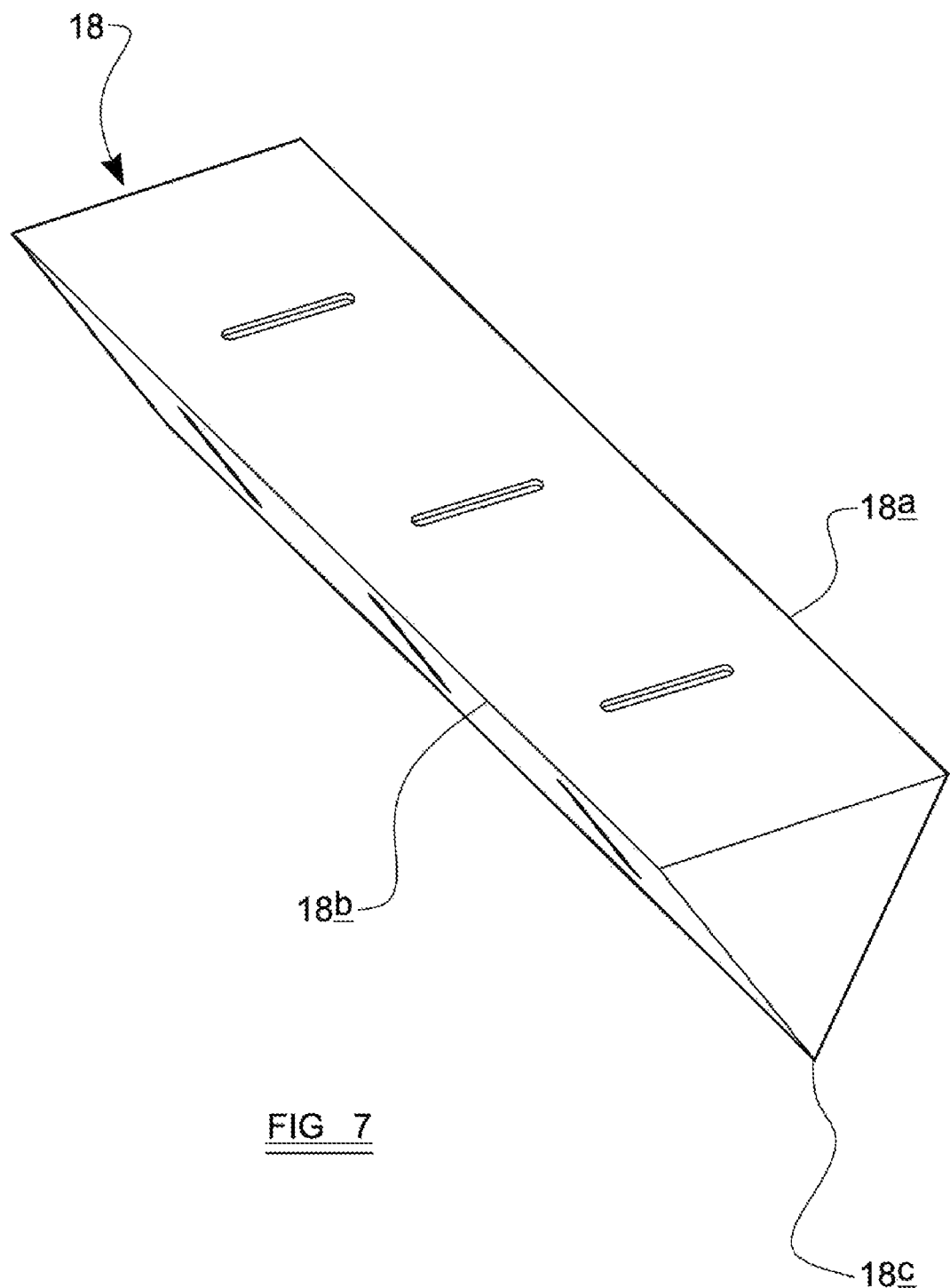

FIGS. 4A-D are side perspective views of a second embodiment of a cutting device or cropper in accordance with the present invention;

FIG. 5 is a cross sectional perspective view of some of the internal components of the cutting device of FIG. 4;

FIG. 6 is a front view of a modified third embodiment of a cutting device of the present invention; and FIG. 7 is a view of a blade for use with the cutting device or cropper of the present invention.

Before describing the various non-limiting embodiments of the present invention, we would point out that for the sake of consistency we will use the same reference numerals to identify the corresponding parts in the different embodiments of the cutting device of the present invention.

Figure 1:
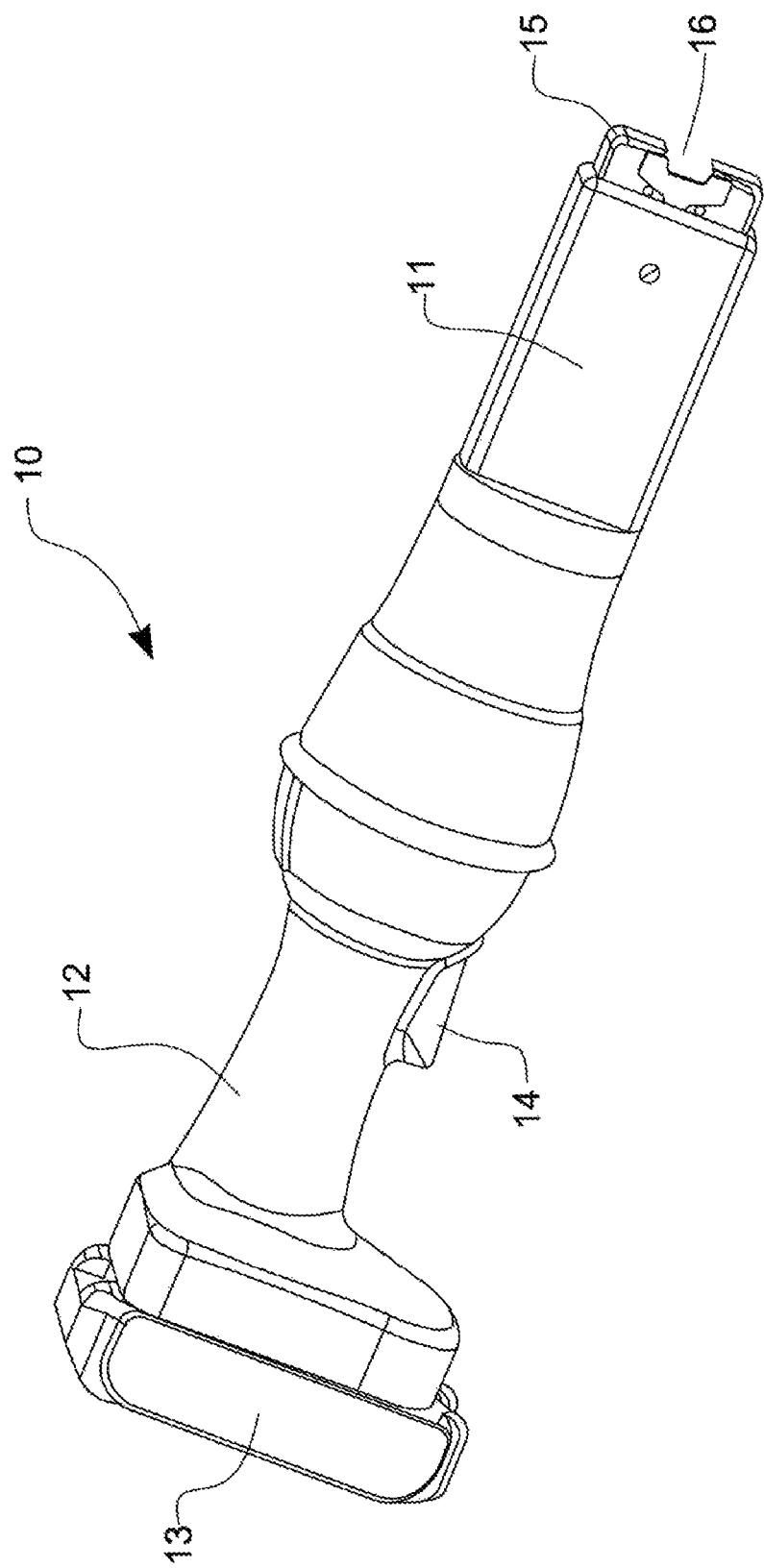
FIG. 1 is a side perspective view of a first cutting device or cropper device of the present invention.

As illustrated in FIG. 1, a first hand held cutting device or cropper 10 in accordance with the present invention comprises a handle 12, which includes a trigger or push button 14, which when pulled or depressed actuates the cutting device 10.

Attached to one end of the handle 12 is a power source 13, preferably in the form of a removable, rechargeable battery pack. Preferably, the battery is a lithium-ion battery or a graphene battery. As will be appreciated, it is preferable that the battery pack is readily removable and replaceable such that if the battery is fully discharged, it can be readily replaced thereby reducing the amount of down time in the event that the battery is fully discharged during use.

Although not illustrated, the handle 12 houses the hydraulic drive system used to drive the cutting components of the cutter 10.

Attached to the other end of the handle 12 is the housing 11, which houses the hydraulic drive system and the cutting components. Preferably, the housing includes at least one removable panel to allow easy access to the working components of the cutting device of the present invention.

With further reference to FIG. 1, the cutting device 10 includes a mouth 16 which is sized to receive a collar 28, which is to be cut.

Staying with FIG. 1, the opening of the mouth 16 is flanked at either side by two guards 15. Preferably, the guards 15 are replaceable. Further preferably, the outer surfaces of the guard are polished thereby providing a smooth outer surface. As will be appreciated, the guard 15 serves two purposes. The first is to prevent the internal components of the cutting device, in particular the cutting blades 18, coming into contact with the surface of the aircraft adjacent to the base of the collar 28 during the cutting process. The second is that because of the guard 15, the cutting device 10 will not damage the surface of the aircraft (not illustrated) adjacent the base of the collar 28, that is, on being placed over the collar 28 to be cut.

Figure 2:
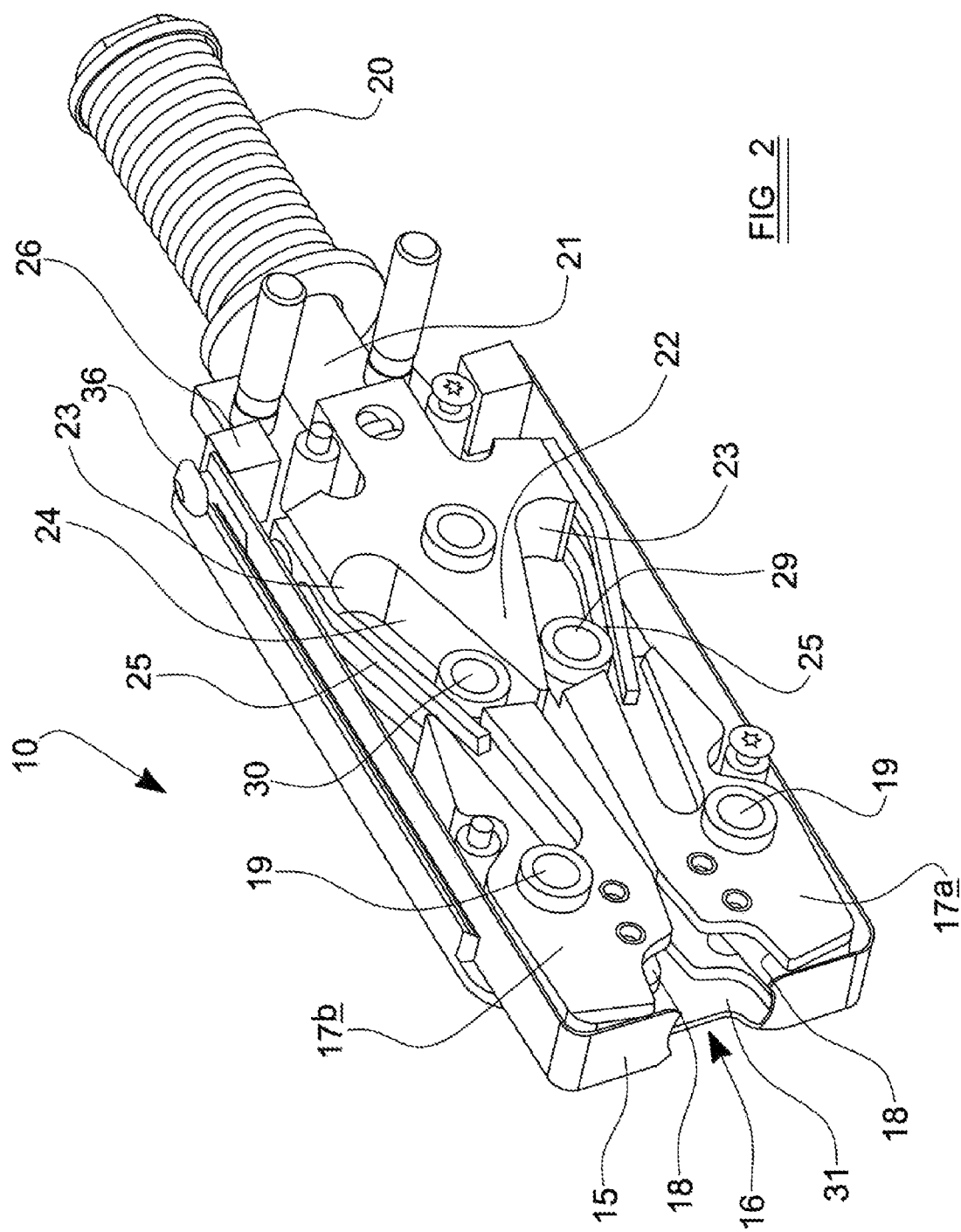
FIG. 2 is a cross sectional view of the internal components of the cutting device of FIG. 1.

With particular reference to FIG. 2, which illustrates the components of the cutting device 10 housed within the housing 11, the cutting device 10 includes two opposing jaws 17a and 17b. As illustrated, the jaws 17a and 17b are pivotally mounted within the mouth 16 of the cutting device 10 by way of fixed spindles 19. The respective jaws 17a and 17b pivot about the axis of the spindles 19. Although both jaws 17a and 17b are moveable, it is to be appreciated that the cutting device of the invention could be configured such that one jaw is moveable and the other jaw is stationary.

As illustrated, a blade 18 is attached, preferably removeably attached, to each jaw 17a, 17b. Each blade 18 includes a cutting surface or edge 18a. As it is preferable to cut the collar 28 into two halves, it is preferable that the cutting edges 18a of the blade 18 are held by their respective jaws 17a/17b so that they are diametrically opposite one another or substantially diametrically opposite one another.

With particular reference to FIG. 7, the blade 18 is preferably triangular in cross section thereby providing at least three cutting edges 18a, 18b and 18c. That is, if one cutting edge 18a of the blade 18 becomes blunt through use, the blade 18 can simply be rotated through 120 degrees and reattached to its associated jaw 17a/17b to provide a "new" sharp cutting edge 18b. Additionally, if the blade 18 is long enough such that when positioned only half or less of the cutting edge 18a actually comes into contact with the collar 28 to be cut, once the blade 18 has been rotated three times, it can simply be flipped lengthwise and reattached to its associated jaw 17a/17b. In this situation, the blade 18 provides six cutting edges.

Although the blade 18 is described as being preferably triangular in cross section (i.e. tri-blade), it is to be appreciated that any other shape of the blade is envisaged, including a blade which is diamond, trapezoid, rhombus, pentagon, parallelogram or hexagon etc. in cross-section.

As will be appreciated, because the blade 18 preferably has more than one cutting surface 18a/18b/18c, in the event that a cutting surface 18a becomes blunt through use, the act of switching to a non-blunt cutting surface 18b/18c is relatively easy. This increases the efficiency of the use of the present cutting device 10, because there is less downtime when replacing a blunt blade.

With further reference to FIG. 2, the cutting device or collar cropper 10 includes a driving wedge 22, which is attached or coupled to a driving rod 21. The driving wedge 22 includes two drive surfaces 24 upon which rollers 29, mounted on spindles 30, move. The driving wedge 22 also includes two stop surfaces 23.

The driving wedge 22 and rod 21 are held in its inactive state or rest position by spring member 20. As illustrated, the spring 20 is helical in construction, although it is to be appreciated that any other suitable form of spring or resilient member may be used to resiliently bias the driving wedge 22 and rod 21 towards the handle 12 i.e. away from the mouth 16 of the cutting device 10.

As illustrated in FIG. 2, the guard 15 is preferably L-shaped in configuration and is preferably releasably held between a restrainer block 26 and restraining nut 36. The benefit of being releasably held is that the act of replacing the guard 15 will be relatively straightforward. Once again, this reduces the amount of downtime in the event that the guard 15 needs to be replaced.

In the event that a collar 28 is to be cut, the device 10 is positioned over the collar 28 to be removed such that the collar 28 to be removed is located within the mouth 16 between the jaws 17a and 17b.

As shown in FIG. 2, a side guide 31 is located on either side of the mouth 16. The side guides 31 ensure that when the cutting device 10 is located over the collar 28 to be cut, the jaws 17a/17b are centered so that the collar 28 is cut in half.

Once the collar 28 is suitably positioned within the mouth 16 via the side guides 31, the user will depress the trigger 14 thereby actuating the hydraulic system (not illustrated) located within the handle 12 which causes the drive rod 21 to act against the resilient spring member 20 such that the driving wedge 22 is pushed by the drive rod 20 against the bias of the spring member 20.

Figure 3A:
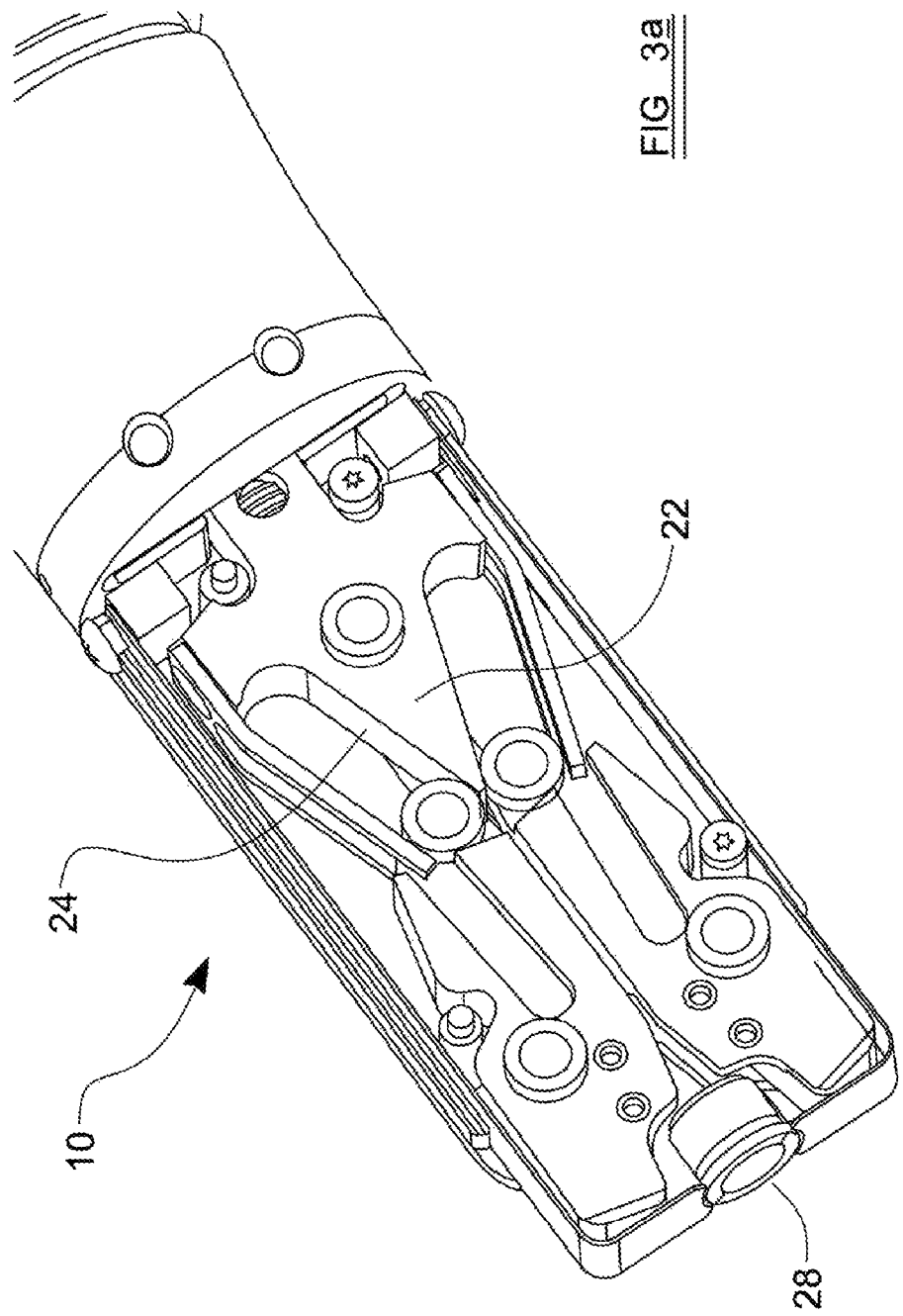
Figure 4D:
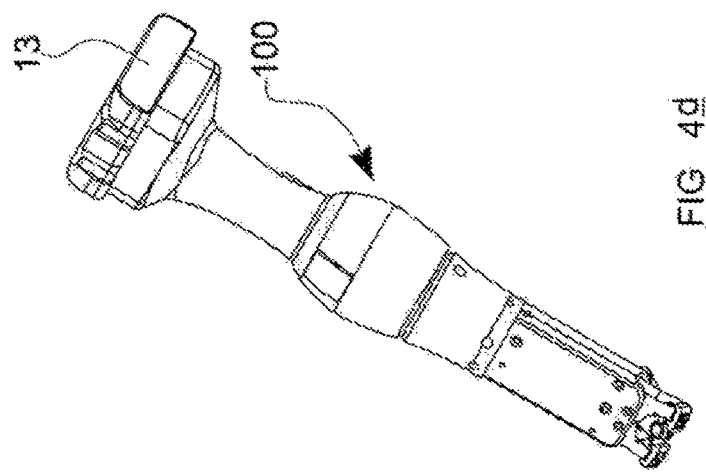
Figure 4C:
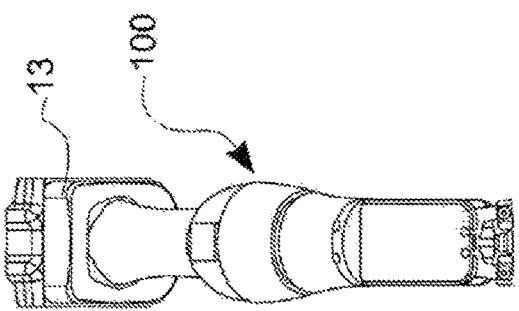
Figure 4B:
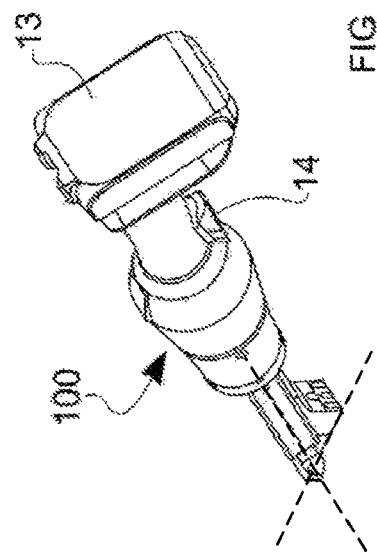
Figure 4A:
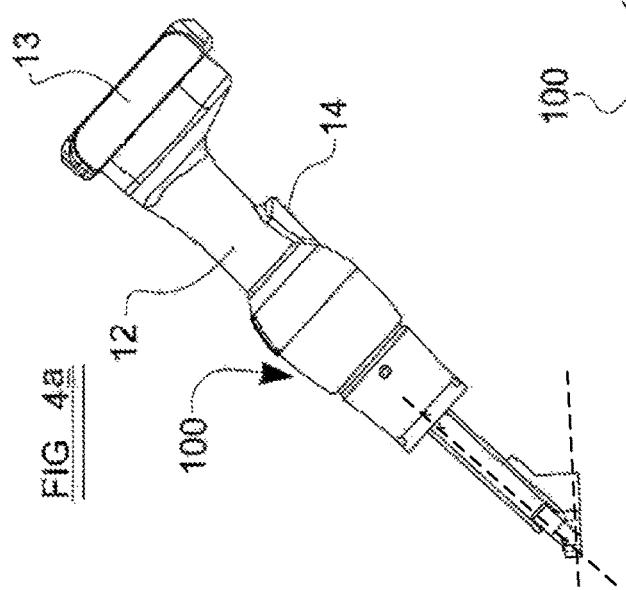

As illustrated in FIGS. 3A-C, as the driving wedge 22 is pushed forward, the rollers 29 make their way up the wedge drive surfaces 24 such that by the action of the wedge drive surfaces 24 making contact with the jaws 17a/17b, cause the jaws 17a/17b to pivot towards one another about the axis provided by their respective spindles 19 such that the respective cutting edges 18a of the blades 18 cut into opposite sides of the collar 28 thereby cutting it in half. To this end, the extent of the pivot and hence the cut, is controlled by the length of the wedge drive surfaces 24 in that when the rollers 29 reach their respective stops 23 on either side of the driving wedge 22, the cut is complete because the driving wedge 22 cannot move any further. At this point, the hydraulic system is deactivated and by way of the resilient spring 20 and the retraction fingers 15, the driving wedge 22 is returned to its resting or inactive position. At this point, the user can readily remove the cut collar 28 which is held within the mouth 16 of the cutting device 10.

As will be appreciated, in this embodiment, on carrying out the cutting process, the blade 18 engages with the end of the collar 28 distal to the aircraft surface (not illustrated) on which the collar 28 is located thereby effecting a cut from the top to the bottom of the collar 28.

As illustrated in FIGS. 4a-4d and 5, an alternative cutting device 100 in accordance with the present invention is provided.

By comparison to the cutting device 10 of the preceding figures, the blades 18 do not lie in the same plane as the jaws 17a/1b, rather the blades 18 are offset relative to the plane of the jaws 17a/17b, preferably by 45 degrees. This enables the device 100 not to be held directly above the collar 28 to cut the collar 28. This allows the device 100 to be used to cut collars 28 in confined spaces.

In addition, and with specific reference to FIG. 5, the side guide 31 is provided or located at one side of the mouth 16 and is shaped so as to abut against and hence, centre the collar 28 relative to the blades 18. To this end, the surface of the side guide 31 against which the collar 28 abuts complements the shape of the outer surface of the collar 28.

Furthermore, and with additional reference to FIG. 5, the device 100 is provided with additional stops 50 adjacent the side guide 31.

In this embodiment, the cutting device 100 is placed over the collar 28 to be cut such that the collar 28 is located within the mouth 16. The user then positions the cutting device 100 such that an outer surface of the collar 28 abuts against the side guide 31 and hence, is centered relative to the blades 18. Once centered, the driving wedge 28 is actuated via the trigger 14, thereby cutting the collar 28 in half. By the action of the additional stops 50, the cut collar 28 is retained within the mouth space 16.

With specific reference to FIG. 6, the side guide 31 provided at either side of the mouth 16 is made from a resilient plastics material, such as polyurethane. In use, the side guides 31 centre the collar 28 to be cut and also, actually assist in retaining the respective halves of the cut collar 28 due to the natural give of the plastics material from which it is made.

It is to be appreciated that the cutting device of the present invention can be provided with differently sized size guides 31 which are readily interchangeable and replaceable depending on the size of the collar to be cut.

It is also to be appreciated that the size guides can be made of a resilient material such that one size enables all sizes of collar to be cut.

It is also to be appreciated that the cutting device of the present invention can be used to remove a collar from any bolted fixing provided on the surface of an object where it is desirable not to damage the surface of the object adjacent to the collar being removed.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A cutting device for use in cutting a collar which is mounted on a bolt in half, the cutting device comprising:
   a mouth for receiving the portion of the collar to be cut;
   a pair of jaws diametrically opposite one another and defining a plane of the pair of jaws, and located within the mouth,
   each jaw being provided with a cutting blade, wherein the cutting blade lies in a cutting blade plane which is offset from the plane of the jaws;

a driver for moving at least one jaw relative to the other such that the collar can be cut in half by the action of the jaws moving towards one another and including a stop member; and a guard which, in use, prevents the cutting blade from protruding beyond the mouth and damaging a surface adjacent to the collar to be cut in half.

2. The cutting device of claim 1, wherein the cutting device includes a handle and can be hand-held in use.

3. The cutting device of claim 1, wherein the guard is removeably attachable to the cutting device.

4. The cutting device of claim 1, wherein at least an outer surface of the guard is polished.

5. The cutting device of claim 1, wherein the guard is provided by two L-shaped or substantially L-shaped members, each located at either side of the entrance to the mouth.

6. The cutting device of claim 1, wherein the device is battery powered.

7. The cutting device of claim 6, wherein the device comprises a rechargeable battery pack.

8. The cutting device of claim 7, wherein the rechargeable battery pack is removeable.

9. The cutting device of claim 7, wherein the battery is a lithium-ion battery or a graphene battery.

10. The cutting device of claim 1, wherein the driver is driven by an integral hydraulic driver system.

11. The cutting device of claim 1, wherein the jaws are pivotably mounted within the cutting device and the driver causes them to pivot towards one another to cut the collar.

12. The cutting device of claim 11, wherein the driver is wedge shaped.

13. The cutting device of claim 1, wherein the cutting device includes a resilient member such that the driver is resiliently biased by the action of the resilient member such that the driver is prevented from causing the jaws to move towards one another prior to the driver being actuated.

14. The cutting device of claim 1, wherein the device further includes a side guide to center the collar relative to the jaws.

15. The cutting device of claim 14, wherein the side guide is provided at either side of the mouth.

16. The cutting device of claim 14, wherein the side guide is provided at one side of the mouth.

17. The cutting device of claim 14, wherein an outer surface of the side guide is shaped to complement an outer surface of the collar.

18. The cutting device of claim 14, wherein the side guide is molded from a plastics material.

19. The cutting device of claim 1, wherein the device is a hydraulic hand-held collar cropper.

20. A method for cutting a collar attached to a bolt located on a body of an aircraft, the method involving the use of a cutting device by engaging a cutting blade of each jaw with the collar, wherein the cutting device comprises:

a mouth for receiving the portion of the collar to be cut;

a pair of jaws diametrically opposite one another and located within the mouth, each jaw being provided with the cutting blade, a driver for moving at least one jaw relative to the other such that the collar can be cut in half by the action of the jaws moving towards one another, and a guard which, in use, prevents the cutting blade from protruding beyond the mouth and damaging a surface adjacent to the collar to be cut in half.

21. A blade for use with a cutting device, wherein a blade is triangular or substantially triangular in cross section, and wherein the cutting device comprises:

a mouth for receiving the portion of the collar to be cut;

a pair of jaws diametrically opposite one another and located within the mouth, each jaw being provided with the cutting blade, a driver for moving at least one jaw relative to the other such that the collar can be cut in half by the action of the jaws moving towards one another, and a guard which, in use, prevents the cutting blade from protruding beyond the mouth and damaging a surface adjacent to the collar to be cut in half.

\* \* \* \* \*